May 17, 1949.  N. BREWER  2,470,234
APPARATUS FOR FORMING PRECISION-BORE
TUBING OR THE LIKE
Filed Dec. 20, 1944  6 Sheets-Sheet 2
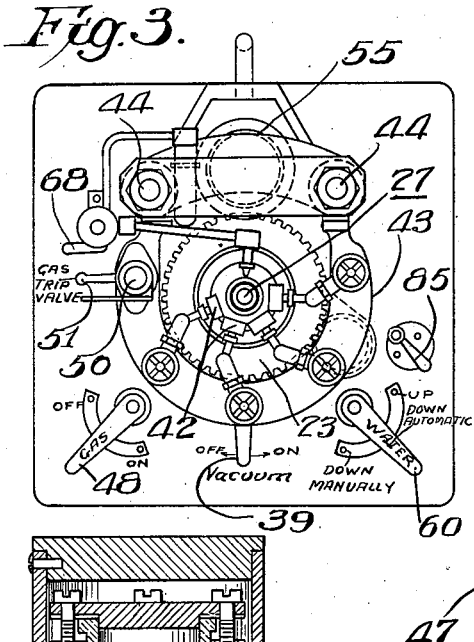
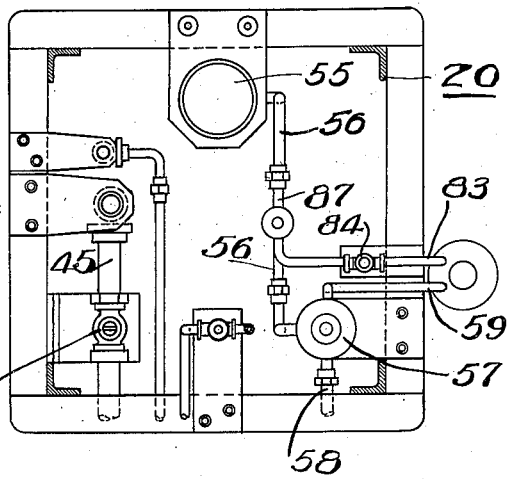
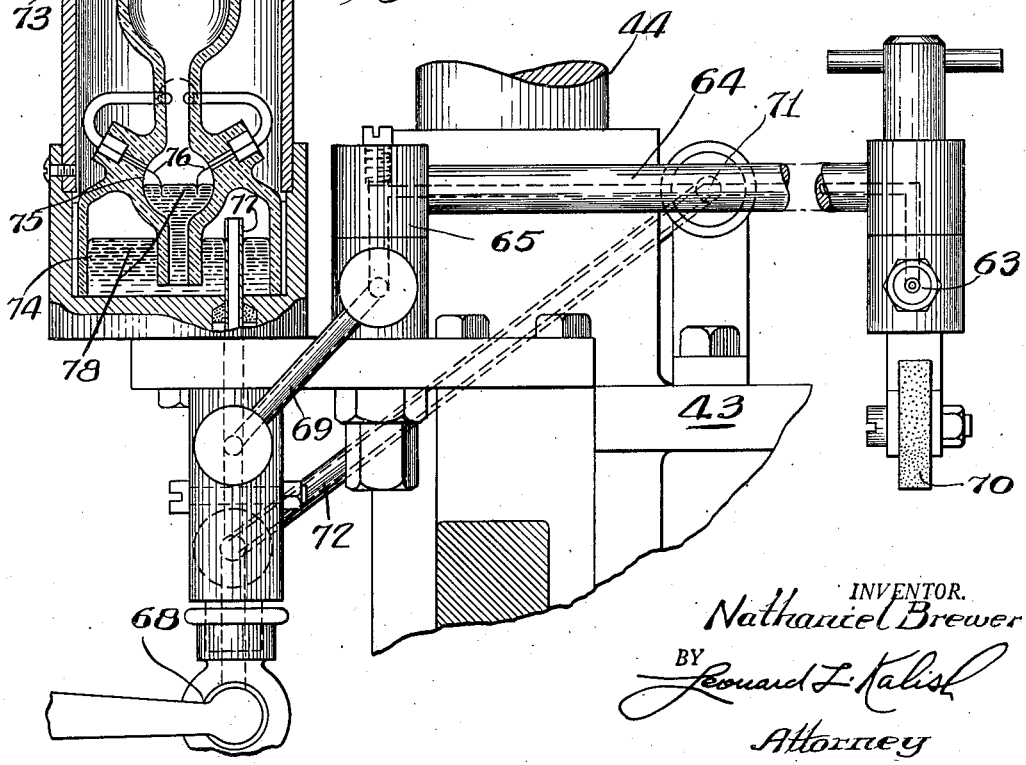

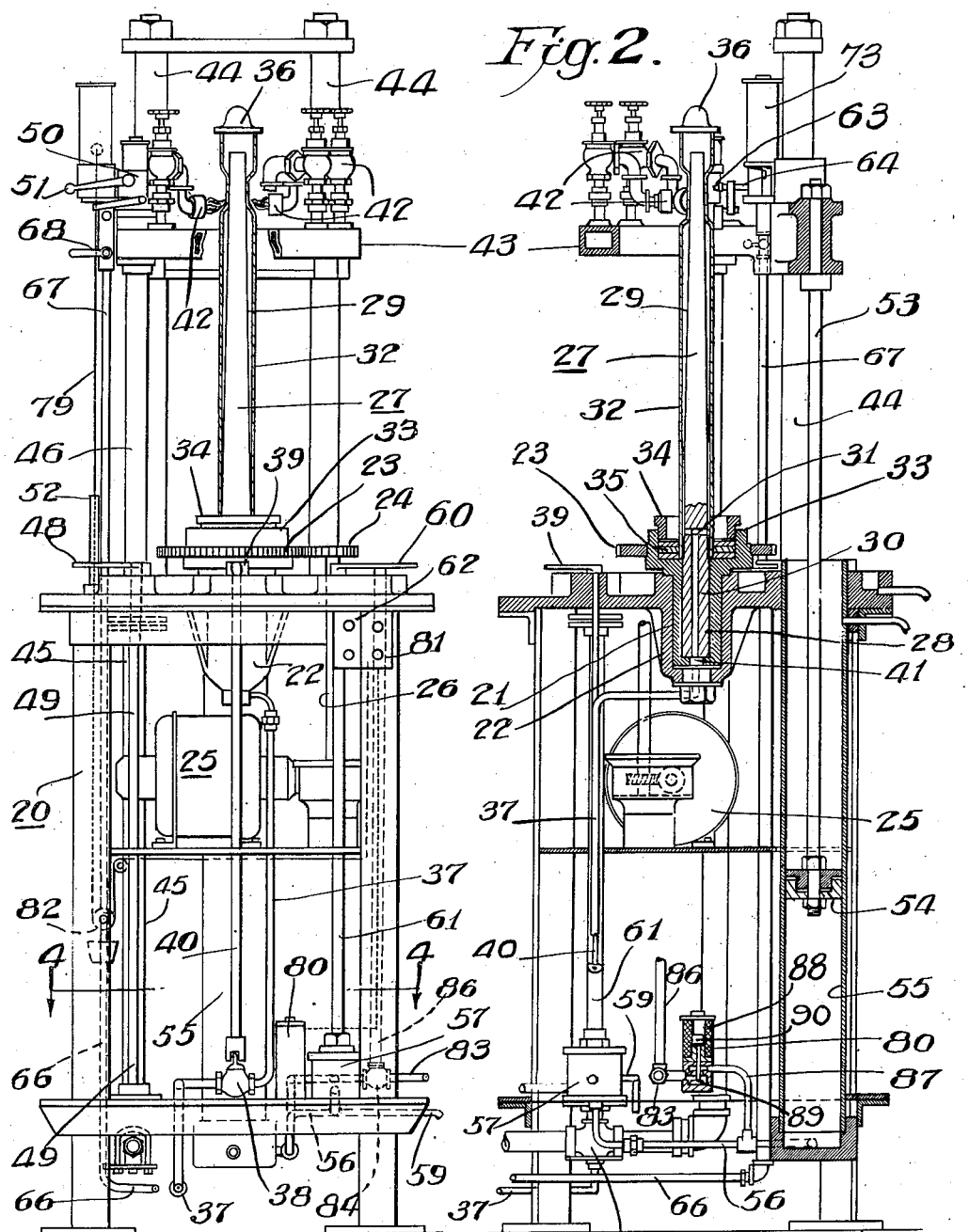

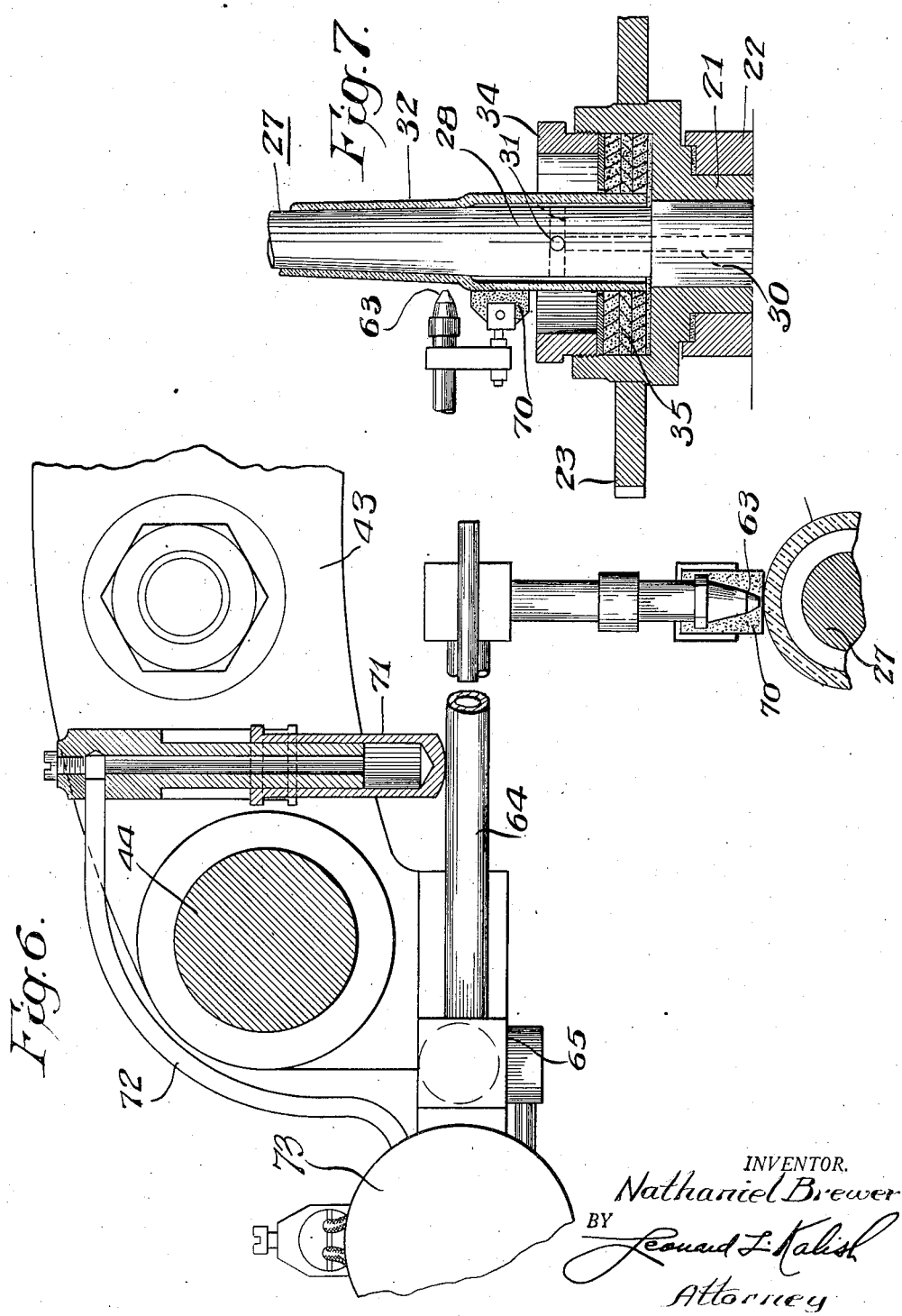

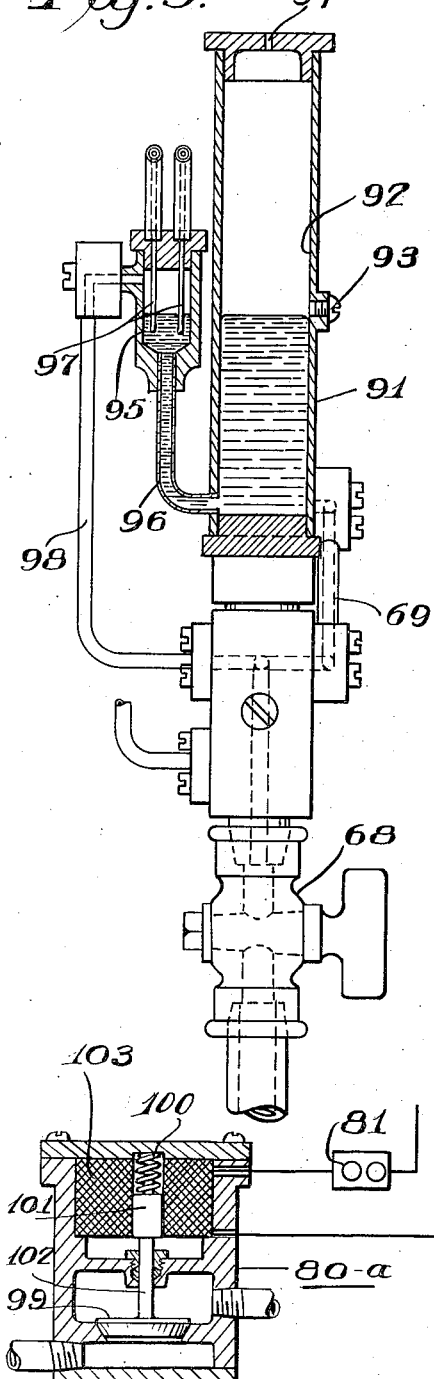
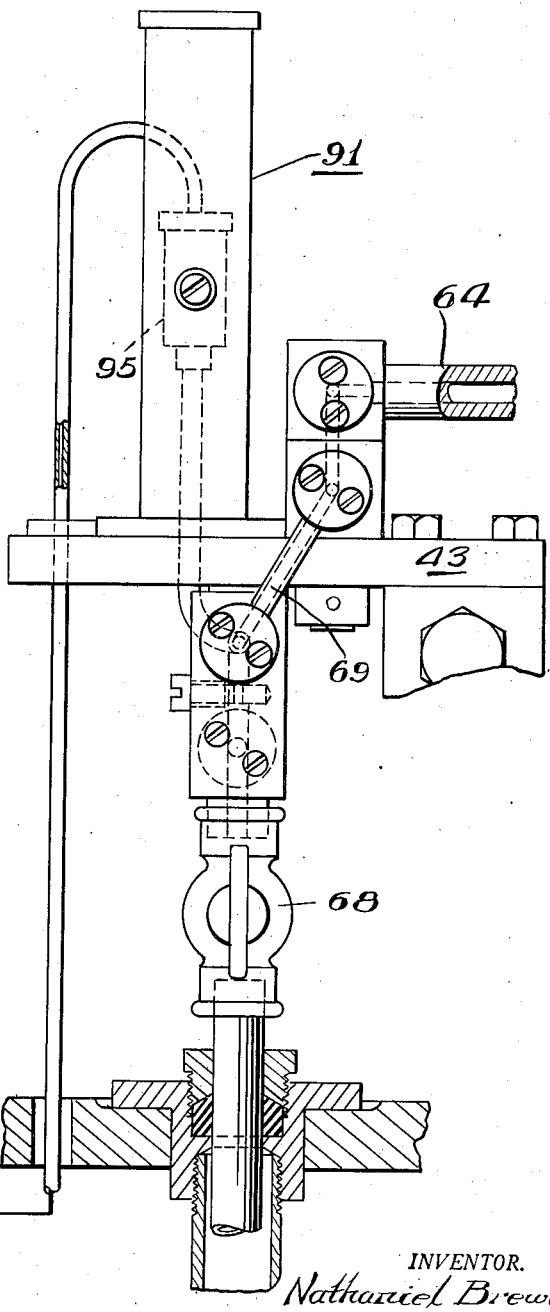

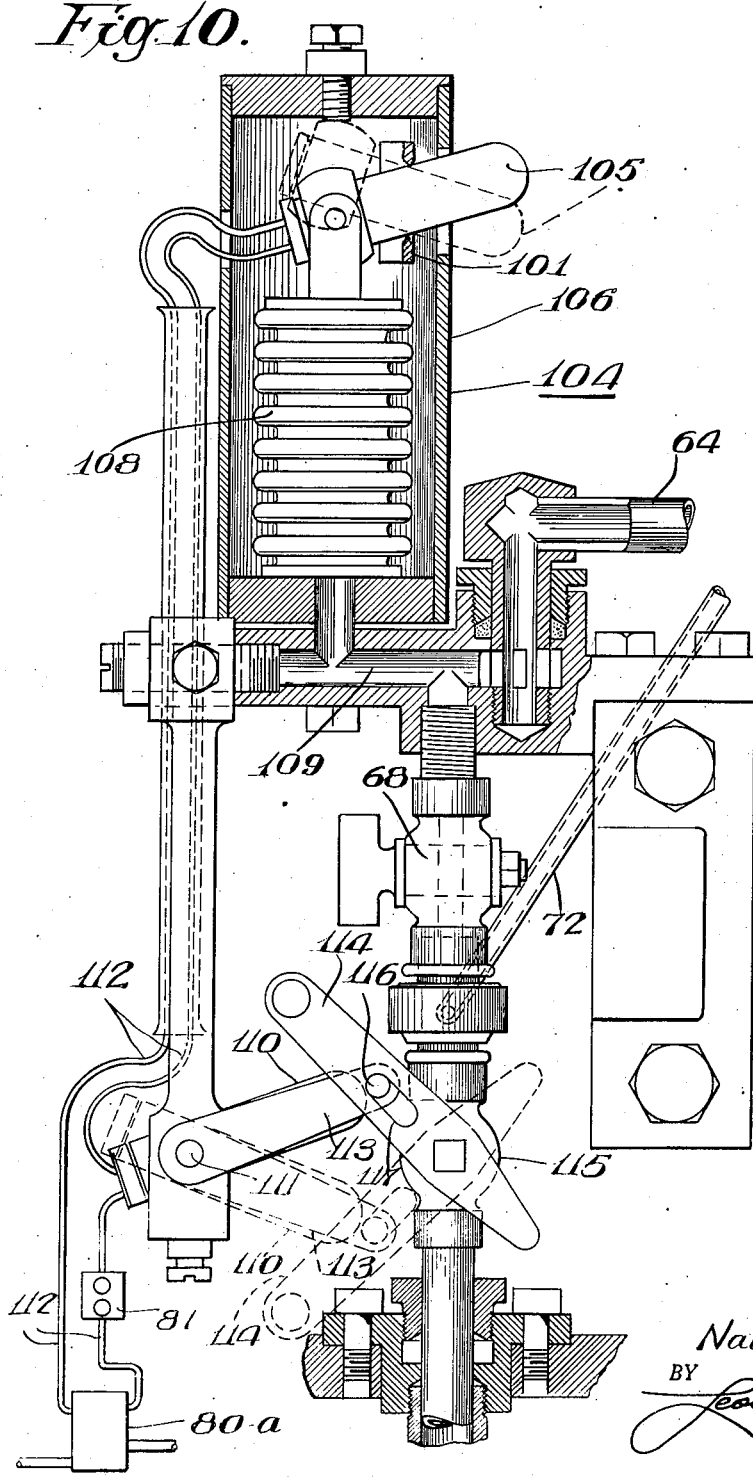

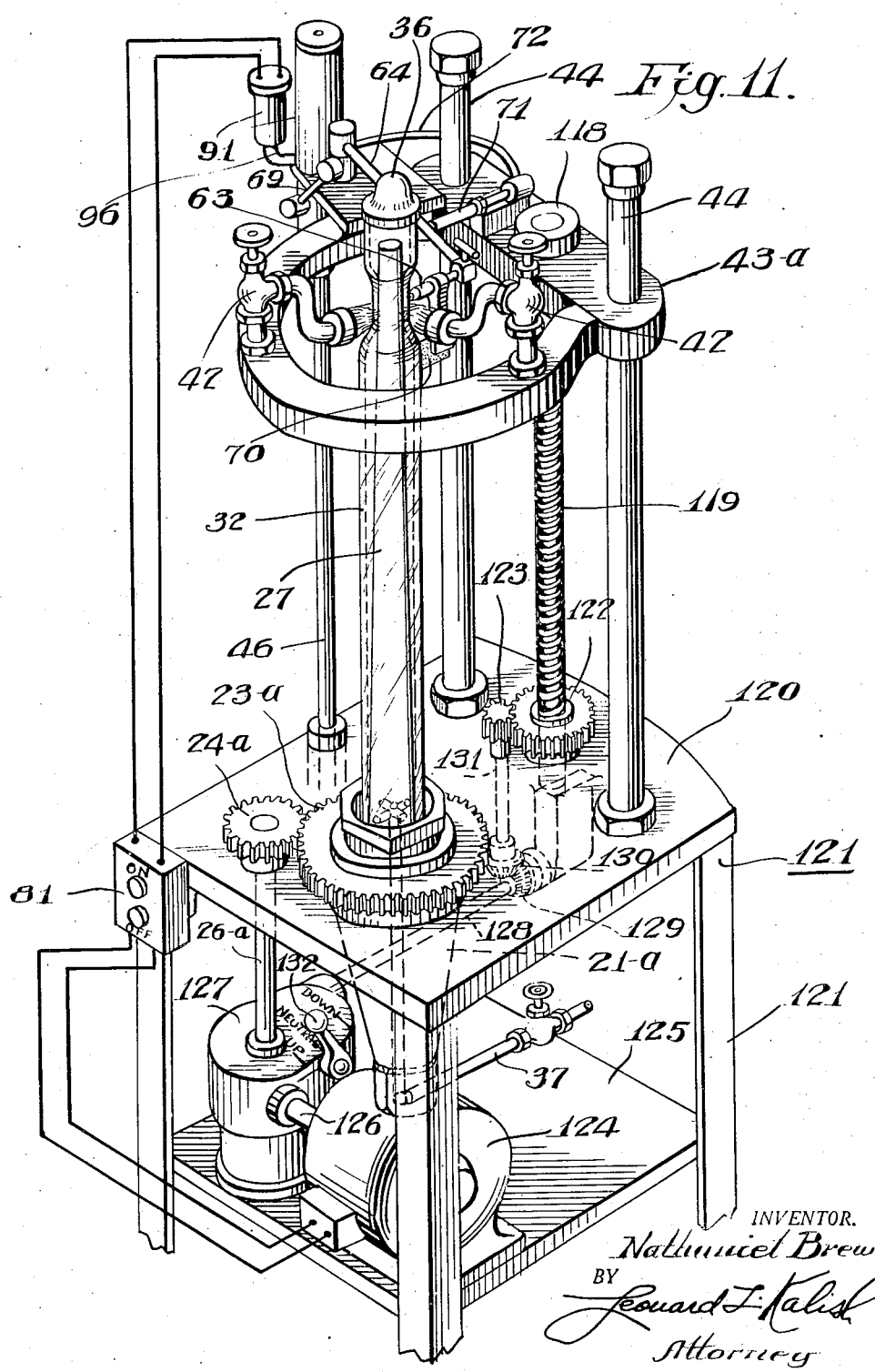

Patented May 17, 1949

UNITED STATES PATENT OFFICE 2,470,234

2,470,234
APPARATUS FOR FORMING PRECISION-BORE TUBING OR THE LIKE

Nathaniel Brewer, Newtown, Pa., assignor to Fischer & Porter Company, Hatboro, Pa., a corporation of Pennsylvania Application December 20, 1944, Serial No. 568,980

15 Claims. (Cl. 49—7)

1

The present invention relates to apparatus for making tubing or the like of glass or other thermoplastic material.

An object of the present invention is to provide a new and improved apparatus for making tubing or the like from glass, quartz, synthetic resin, or other similar thermoplastic material. Another object of the present invention is to provide a new and improved apparatus for making glass, quartz, synthetic resin, and other thermoplastic products containing a precision-bore. Still another object of the present invention is to provide an apparatus for continuously and automatically forming tubing or the like of thermoplastic material. A further object of the present invention is to provide an apparatus for automatically forming a tapered or other predetermined inner bore within a body of thermoplastic material.

Other objects and advantages of the present invention will be apparent in the following detailed description, appended claims and accompanying drawings.

It has been suggested in the past to form glass tubing or the like by mounting an over-size tube upon a mandrel of suitable shape, evacuating the tube, and heating the evacuated tube to its softening point to permit the atmospheric pressure to collapse the evacuated softened tube upon the mandrel.

It has also been proposed to mount the tube upon a rotatable mandrel and gradually to collapse the tube upon the mandrel by applying heat to the outside of one end of the tube until it softens and collapses upon the mandrel, and by thereafter gradually moving the source of heat axially of the tube thereby gradually to soften and collapse consecutive portions of the tube upon the mandrel.

One great difficulty encountered with these conventional constructions heretofore employed has been that an operator is required to move the heating means axially of the tube during the forming operation. That is, it has been necessary, in the past, for an operator to watch each glass lathe carefully in order to move the burner or other heating means axially along the rotating tube at a rate just sufficient to give steady collapse of consecutive portions of the tube upon the mandrel. This human factor has proven to be a serious drawback in the production of tubes or the like in which bores of extreme accuracy are required. Thus, if the operator moves the burner too rapidly, the tube may not be fully collapsed upon the mandrel so that bulges or pockets may result in the final product. Furthermore, too rapid movement of the burner may result in improper and insufficient annealing which weakens and distorts the final tube. On the other hand, too-slow movement of the burner

2 is wasteful of fuel and, additionally, it has been found that the quality of the final product is impaired when the glass or other material is subjected to excessively long heating during the bore-forming operation. Furthermore, this too-slow movement of the burner tends to overheat the mandrel and thereby greatly to shorten its life.

Another disadvantage in conventional constructions heretofore employed has been that the operator tends to move the burner irregularly; for example, he may move it too rapidly for a short distance and may then hold it for an undue length of time at a single point. This tends to create undesirable stresses and strains in the final product, which not only impair the accuracy of the inner bore but also weaken the product to a point at which it may readily fracture or shatter during use.

Accordingly, the present invention contemplates a new and improved apparatus for automatically moving the burner element of a glass lathe during the bore-forming operation, at a rate corresponding precisely to the rate of collapse of the tube upon the mandrel.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a front elevational view of one embodiment of the present invention at is appears shortly after the start of a bore-forming operation; parts being broken away better to reveal the construction thereof.

Figure 2 represents a view, partly in side elevation and partly in cross-section, of the embodiment of Figure 1.

Figure 3 represents a top plan view of the embodiment of Figure 1.

Figure 4 represents a cross-sectional view generally along the line 4—4 of Figure 1.

Figure 5 represents a view, partly in section and partly in elevation, on an enlarged scale, of the nozzle and automatic switch mechanism of the embodiment of Figure 1.

Figure 6 represents a view, partly in section and partly in elevation, of the nozzle-swinging mechanism.

Figure 7 represents a fragmentary view, partly in section and partly in elevation, showing the nozzle and tube as they appear near the end of the forming operation.

Figure 8 represents a fragmentary side elevational view generally similar to that of Figure 5 but showing an alternative form of switch mechanism for automatically moving the burners.

Figure 9 represents an end view, partly in section and partly in elevation, of the embodiment of Figure 8.

Figure 10 represents a view generally similar to those of Figures 5 and 8 but showing still another form of switch mechanism for moving the burners.

Figure 11 represents a more or less schematic perspective view of another embodiment of the present invention wherein purely mechanical means are employed for raising and lowering the burners in place of the hydraulic mechanism shown in Figures 1 and 2.

Referring now more particularly to the embodiment of Figures 1 to 7 inclusive, one form of the present invention may comprise a generally vertically disposed glass lathe which is mounted upon any suitable structural frame 20 of metal or the like.

A vertical spindle 21 is rotatably mounted within a suitable well or housing 22. The spindle 21 is provided with a gear wheel 23 with which a spur gear 24 is interengaged. The spur gear 24 is adapted to be driven by a motor 25 through a connecting shaft 26 thereby to rotate the spindle 21.

A mandrel 27 is adapted to be fitted within the spindle 21 and to extend vertically upward therefrom.

The mandrel 27, which may be of stainless steel or other suitable heat-resistant material, may include a general cylindrical lower portion 28 and a main tapered portion 29; the tapered portion 29 being accurately finished to correspond to the tapered inner bore of a tube to be formed thereon. An axial opening extends upward from the lower end of the mandrel 27 to a point a short distance above the lower end of the tapered portion 29. The axial opening 30 communicates at its upper end with one or more radial openings 31.

A generally cylindrical tube 32 of glass (or quartz or synthetic resin or other suitable thermoplastic material) is adapted to be mounted upon the mandrel 27. The glass tube 32 has an inside diameter slightly greater than the maximum diameter of the tapered portion 29 of the mandrel 27, so that an annular clearance is provided therebetween.

The lower end of the glass tube 32 terminates generally at the lower end of the tapered portion 29 of the mandrel 27. A fluid-tight seal is provided for the lower end of said tube 32 by a stuffing-box 33, a screw-threaded stuffing-gland 34 and compressible packing rings or gaskets 35 disposed at the upper end of the spindle 21.

The upper end of the tube 32 is closed off by any suitable cap or plug 36 which may be of flexible heat-resistant synthetic rubber composition or other suitable material.

It is apparent that rotation of the spindle 21 will rotate the co-axially mounted mandrel 27 and tube 32.

A suction line 37 is connected to the lower end of the well or housing 22; the line 37 leading to any suitable suction or vacuum pump (not shown) and being provided with a control valve 38 which is operated by a handle 39 through a shaft 40.

The lower end of the spindle 21 is provided with an opening 41 communicating with the axial opening 30 in the mandrel 27.

It is apparent that, when the valve 38 is open, suction will be communicated to the annular space intermediate the glass tube 32 and the mandrel 27, thereby to evacuate said annular space to a point at which the air pressure therein is substantially below atmospheric pressure.

A plurality (for example, 4) of burners 42 are mounted upon a manifold 43 and are disposed about the tube 32; the tips of the burners being generally adjacent and normal to said tube 32. The burners 42 preferably occupy somewhat less than 360° so that space is left adjacent the wall of the tube for a valve nozzle to be hereinafter described.

The manifold 43 is slidably mounted upon a pair of posts 44 which extend upward from the rear of the frame 20.

Illuminating gas (or acetylene or hydrogen or other gaseous fuel) is supplied to the manifold 43 through the lower line 45 and the upper line 46; the lines 45 and 46 being arranged in fluid-tight telescopic relationship to permit up-and-down movement of the upper line 46 along with manifold 43 as the latter moves upon the posts 44. A valve 47 is provided in the lower gas line 45 and is adapted to be operated by the handle 48 through the shaft 49.

A cut-off valve 50 is provided in the upper gas line 46; the valve 50 having a trip lever 51 which is adapted to be moved by a trip pin 52 mounted at the upper end of the frame 20 so as to automatically shut off the burners 42 when the manifold reaches its lower limit of travel as will be hereinafter described.

The individual burners 42 are provided with conventional air-inlet openings (not shown) so that a combustible gas-air mixture is fed to the tips or nozzles of the burners as is customary. Alternatively, oxygen may be supplied to the burners 42.

An operating rod 53 extends downward from the manifold 43 and terminates in a piston 54 which is disposed within an elevator cylinder 55 mounted at the rear of the frame 20.

A pipe 56 leads from the bottom of the cylinder 55 to a three-way valve 57. A water inlet line 58 and a drain line 59 are also connected to the valve 57. The valve 57 is controlled by the operating handle 60 through the shaft 61. As shown particularly in Figure 3, the handle 60 can be turned to "Up" position wherein the valve 57 is turned to connect the inlet line 58 to the pipe 56 (the drain line 59 being shut off) to permit water under city pressure to enter the bottom of the elevator cylinder 55 and thus to raise the piston 54, the operating rod 53 and the manifold 43.

The operating handle 60 can also be turned to the "Down manually" position wherein the valve 57 is turned to connect the drain line 59 with the pipe 56 (the inlet line 58 being shut off) to permit water to drain from the cylinder 55 and thus to lower the piston 54, the operating rod 53 and the burner manifold 43.

When the operating handle 60 is in its central "Down automatic" position, the valve 57 is turned to shut off both the inlet line 58 and the drain line 59 from the pipe 56 so that the piston 54, the operating rod 53 and the burner manifold 43 remain stationary unless the automatic valve to be hereinafter described is functioning.

It is apparent that the burner manifold 43 can be moved under manual control through the operating handle 60. Thus, the handle 60 can be turned to "Up" position to raise the piston 54, the operating rod 53 and the burner manifold 43 to their uppermost position at the start of a tube-forming operation.

The motor 25 can then be turned on by means of the switch 62 to start rotation of the spindle 21 and the co-axially mounted mandrel 27 and tube 32. The suction can then be turned on by turning on the suction control valve 38 to evacuate the annular space intermediate the mandrel 27 and the glass tube 32.

The gas can then be turned on by turning the valve 47, and the burners 42 can be lighted.

In order to give the tube 32 a preliminary warming up, the valve 57 can be turned to the "Down manually" position to permit the water to drain from the cylinder 55 relatively rapidly and thus to cause the manifold 43 and the burners 42 to move down along the rotating tube 32. The handle 60 can then be turned to the "Up" position to again raise the burners 42 to a point adjacent the uppermost end of the mandrel 27, whereupon the handle 60 can be turned to its neutral "Down automatic" position to hold the burners at that point.

The burners 42 are held at their starting point until the heat of their flames is sufficient to raise the temperature of the glass to its softening point, whereupon the atmospheric pressure will collapse the softened evacuated glass tube 32 upon the mandrel 27. In this way, the original cylindrical bore of the glass tube 32 is changed to a tapered bore corresponding to the tapered surface of the mandrel 27.

As soon as the uppermost portion of the glass tube 32 has collapsed upon the mandrel 27, the burners are lowered gradually by moving the handle 60 to the "Down manually" position to connect the drain line 59 to the pipe 56 and thus to permit water to drain from the cylinder 55.

Under optimum conditions the valve 57 is opened just sufficiently to permit the water to drain from the cylinder 55 at a rate corresponding to the rate of collapse of the glass tube 32 upon the mandrel 27. That is, ideally, the valve 57 is opened slightly and is left untouched and the rate of drainage of water from the cylinder 55 is such that the burners 42 will move downward along the tube 32 at a rate just sufficient to cause continuous and uninterrupted collapse of the glass tube 32 upon the mandrel 27 so that the bore-forming operation is a single continuous and uninterrupted one.

However, as a practical matter it is extremely difficult, if not virtually impossible, to so accurately control the rate of drainage of water from the cylinder 55 as to permit the uninterrupted descent of the burners 42 along the tube 32.

Thus, it becomes necessary for the operator carefully to watch the glass tube to determine its rate of collapse and to regulate the descent of the burners accordingly. That is, in practical operation, the operator watches the tube to determine when the portion adjacent the burners has collapsed, whereupon he moves the handle 60 to the "Down manually" position to permit the burners to drop a little way down. He then moves the handle 60 back to the neutral position to stop the descent of the burners until the next adjacent portion of the tube has collapsed upon the mandrel, whereupon he again moves the valve handle 60 to the "Down manually" position again to lower the burners slightly. Thus, the burners 42 move downward along the rotating evacuated tube 32 in a series of short "stop-and-go" steps.

It is obvious, therefore, that the operator must watch the tube very carefully in order to adjust the rate of descent of the burners to correspond as nearly as possible to the rate of collapse of the tube 32 upon the mandrel 27.

Due to the position of the burners 42 about the tube 32 and due to the flames playing on the tube 32, it is difficult for the operator accurately to determine the condition of the tube. It is readily apparent that accurate manual control of the descent of the burners is thus made extremely difficult.

Accordingly, the present invention contemplates the provision of means for automatically lowering the burners as soon as collapse of the softened evacuated tube has occurred.

The automatic control mechanism includes a restricted nozzle 63, of stainless steel or other heat-resistant material, disposed generally adjacent and normal to the tube 32. As shown in Figure 3, the nozzle 63 may be disposed at the rear of the tube in the area not occupied by the burners 42. As shown in Figure 2, the nozzle 63 may be slightly above the burners 42.

The nozzle 63 is carried by an elongated tube 64 which is pivotally mounted at its other end as at 65 upon the manifold 43.

Air under constant pressure (for example, 15 pounds per square inch) is supplied to the nozzle 63 through the lower and upper telescopically-arranged liens 66 and 67, the valve 68 and the connecting line 69.

A follower shoe 70 of heat-resistant material is mounted below the nozzle 63 and is adapted to rest against the surface of the glass tube 32. The outer edge of the follower shoe 70 extends very slightly beyond the tip of the nozzle 63.

A ram 71 is adapted to bear against the tube 64 and to press the follower shoe 70 against the surface of the glass tube 32; air under pressure being supplied to the ram 71 through the lower and upper air lines 66 and 67, the air valve 68 and the connecting line 72. Instead of being operated by air under pressure, the ram may be simply spring-pressed as is well-known in the art.

A mercury switch 73 is mounted upon the manifold 43 and includes a lower well 74, and an upper chamber 75 into which a pair of spaced electrical contacts 73 extend. A tube 77 extends upward from the bottom of the switch 73 to the upper portion of the well 74. The tube 77 communicates with the air lines 66 and 67 and with the nozzle 63.

The switch 73 contains mercury 78 in its well 74. When air under pressure is introduced into the top of the well 74 through the tube 77, mercury is forced upward from the well into the upper chamber 75. At full, or nearly full, air pressure, the level of mercury within the upper chamber 75 is raised to a point at which it covers the ends of the spaced electrical contacts 76 and thus closes the electrical circuit therebetween. When, on the other hand, the air pressure within the well 74 drops substantially below its normal value, the level of mercury within the upper chamber 75 drops below the ends of the electrical contacts 76 and thus breaks the electrical circuit therebetween.

Flexible electrical wiring 79 connects the electrical contacts 76 of the switch 73 to a solenoid valve 80 through an on-off switch 81; any suitable source of electric current (not shown) being connected in the circuit. The flexible wiring 79 passes over a free weighted pulley 82 which takes up the slack in the wiring and keeps it taut during up-and-down movement of the burner manifold 43.

The solenoid valve 80 is connected, through a pipe 87, to the pipe 56 leading from the lower end of the cylinder 55. A drain line 83 leads from the solenoid valve 80. The drain line 83 is provided with a shut-off valve 84 which is manually operated by a handle 85 through a shaft 86. The shut-off valve 84, which is closed during the manual operation previously described, is turned to open position during the automatic operation to be hereinafter described.

The solenoid valve 80 includes a conventional coil 88 to which the wiring 79 is connected. The solenoid valve 80 also includes a valve element 89 which is provided, at its upper end, with an armature 90 disposed within the coil 88.

When the electrical contacts 76 are not covered by the mercury 78 of the switch 73, the electrical circuit is broken and the coil 88 is not energized so that the valve element 89 remains in its lowermost open position. When, on the other hand, the mercury rises within the chamber 75 of the mercury switch 73 to cover the electrical contacts 76, the electrical circuit is closed and the coil 88 is energized to raise the armature 90, as is well-known in the art, thereby to raise the valve element 89 to closed position.

Automatic operation of the embodiment of Figures 1 to 7 will now be described.

The handle 85 of the shut-off valve 84 is turned to closed position. The handle 60 of the three-way valve 57 is turned to "Up" position, whereupon water passes from the inlet line 58 to the cylinder 55 thereby to raise the piston 54, the operating rod 53 and the burner manifold 43 to their uppermost position. The motor 25 is started by means of the switch 62 to rotate the spindle 21 and the co-axially mounted mandrel 27 and glass tube 32. The burners 42 are lighted and the handle 60 is turned to the "Down manually" position to lower the manifold 43 relatively rapidly and thereby to give the tube 32 a preliminary warming up. The valve 60 is then moved back to the "Up" position to raise the burners to a point generally opposite the upper end of the mandrel 27, whereupon the handle 60 is turned to the "Down automatic" position to stop the burners at that point. Suction is then turned on, and the air valve 68 is turned to open position thereby sending air under pressure to the well 74 of the mercury switch 73 and to the ram 71 and also the nozzle 63.

As shown in Figure 6, before the tube 32 is collapsed, the nozzle 63 is relatively close to the surface of said tube so that escape of air through the nozzle is restricted. Accordingly, air pressure backs up into the well 72 of the switch 73 to force the mercury 78 up into the chamber 75 above the ends of the contacts 76, thereby to close the electrical circuit and to energize the coil 88 of the solenoid valve 80, to lift the armature 90 and to close the valve element 89. Thus, the drain line 83 is closed and no water is permitted to escape from the cylinder 55. Thus, it is apparent that, so long as the tube 32 remains uncollapsed, the nozzle 63 will be partially restricted and the burners 42 will remain stationary and will continue to heat the tube 32 adjacent the uppermost portion of the mandrel 27.

As shown in Figure 7, after this portion of the tube has been heated to its softening point and collapsed upon the mandrel by atmospheric pressure, the clearance between the nozzle 63 and the collapsed portion of the tube 32 becomes greater, due to the fact that the nozzle 63 is maintained in its original position by the shoe 70 which rests against a lower uncollapsed portion of the tube 32. This permits greater escape of air through the nozzle 63 and, accordingly, lowers the air pressure within the well 74, thereby causing the level of mercury within the upper chamber 75 to drop until the contacts 76 are uncovered. This breaks the electrical circuit and de-energizes the coil 88 of the solenoid valve 80 and permits the armature 90 to drop, thereby opening the valve element 89.

Opening of the valve element 89 permits water to drain off from the cylinder 55 through the pipe 56, the pipe 87 and the drain line 83.

Thus, the piston 54, the operating rod 53 and the burner manifold 43 are moved downward until the nozzle 63 again comes opposite an uncollapsed portion of the tube 32. When this occurs, escape of air from the nozzle 63 is again partially restricted so that the air pressure within the well 74 again builds up to close the switch and to energize the coil 88 of the solenoid valve 80 thereby to close the valve 89 and to prevent further escape of water from the cylinder 55. The burners then again remain stationary until this new portion of the tube 32 is collapsed, whereupon the cycle is repeated.

In this way, the burners are automatically moved downward step-by-step corresponding precisely to the rate of collapse of the tube 32 upon the tapered portion 29 of the mandrel 27.

The switch mechanism described hereinabove is extremely accurate and sensitive. Indeed, in actual practice, the downward movements of the burner may be only $\frac{1}{16}$ of an inch or less with correspondingly short pauses between successive movements.

The burners are thus gradually automatically moved downward along the rotating evacuated tube 32 until substantially all of it has been collapsed upon the mandrel. Generally, the ends of the tube 32 are left uncollapsed and these are cut off and discarded; the tapered tube which is thus formed having a smooth and accurate inner bore and being adapted for use, for example, as the metering tube of a rotameter.

The collapse of the tube 32 should preferably be stopped somewhat above the openings 31 in the mandrel 27. The burners 42 are then shut off either manually by turning of the valve 47 or automatically by tripping of the lever 51 of the cut-off valve 50 by the trip pin 52 which is set in predetermined position.

If desired, instead of shutting off the burners 42 at the end of the bore-forming operation, it is possible to close the air valve 68, shut off the switch 81, close the handle 85 of the valve 84, and move the handle 60 of the valve 57 to the "Up" position, whereupon water again enters the cylinder 55 and moves the burners upward along the rotating collapsed tube 32 in order to anneal the tube.

Other conventional annealing operations may be used on the collapsed tube either in conjunction with or in place of the above-described annealing step.

After the burners have been shut off, the collapsed tube and mandrel are removed from the spindle 21, the tube is cooled and removed from the mandrel by slipping it off over the smaller end of the mandrel. The uncollapsed ends of the tube 32 are then cut off as stated hereinabove and the cut ends are fire-polished.

The tube is then ready for use as the metering tube of a rotameter. Since the mandrel is formed with a high degree of precision and accuracy, it is not necessary to calibrate each individual tube. That is, once a tube formed on a given mandrel has been calibrated, every other tube formed on the same mandrel is known to have the same calibration within the limits of accuracy required in a rotameter tube.

Due to the automatic operation of the novel apparatus of the present invention, it is possible to obtain even greater accuracy and uniformity among tubes or the like formed upon a given mandrel, since the rate of collapse of the various tubes formed on the mandrel is more nearly the same, and since improper collapse and internal stresses and strains in the final product are minimized.

Furthermore, as stated hereinabove, the present invention reduces fuel consumption and prevents overheating of the mandrel such as would otherwise greatly shorten its useful life.

In Figures 8 and 9, I have shown a somewhat modified form of mercury switch 91 which may be used in place of the switch 73 of Figures 5 and 6.

In the embodiment of Figures 8 and 9, the nozzle 63 (not shown) is carried by the pivotally mounted tube 64 as in the embodiment of Figures 5 and 6; air under pressure being supplied to the nozzle through the air valve 68 and the connecting tube 69 as previously described.

The switch 91 includes a main chamber 92 provided with a side filling opening 93 and an upper vent 94. A side chamber 95 is connected at its bottom to the bottom of the main chamber 92 by means of a tube 96. When mercury 78 is added through the filling opening 93, the levels in the two chambers 95 and 92 will necessarily be the same when both are at atmospheric pressure. In this position, the ends of a pair of electrical contacts 97, which extend downward within the chamber 95, are covered.

A tube 98 is connected to the upper portion of the side chamber 95 and to the valve 68 and is adapted to transmit air under pressure to said chamber 95 when the valve 68 is turned on.

Wiring 79 extends from the electrical contacts to a solenoid valve 80—a. The solenoid valve 80—a (which is connected to the pipe 56 by means of the pipe 87 and from which the drain line 83 leads as described in connection with the embodiment of Figures 1 to 7) includes a valve element 99 which is normally maintained in a closed position by a helical spring 100. A armature 101 is provided on the stem 102 of the valve element 99; the armature being adapted to move within the coil 103 of said solenoid valve 80—a. It is apparent that when the coil 103 is energized, the armature is raised and the valve element is moved to open position against the pressure of the spring 100. When, on the other hand, the coil is de-energized, the valve element 99 is forced back to closed position by the spring 100.

The operation of the mercury switch of Figures 8 and 9 is as follows:

When the nozzle 63 is adjacent an uncollapsed portion of the tube 32, escape of air therefrom is partially restricted so that the pressure within the chamber 95 builds up sufficiently to depress the level of mercury therewithin until the electrical contacts 97 are uncovered, thereby breaking the electrical circuit and de-energizing the coil 103 of the valve 80—a. As stated above, this closes the spring-pressed valve element 99 and prevents a drainage of water from the cylinder 55, thereby maintaining the burners 42 in fixed position until that portion of the tube 32 is heated to its softening point and collapsed upon the mandrel. When this collapse occurs, the clearance between the nozzle 63 and the tube is correspondingly increased, which permits greater escape of air through said nozzle and results in a drop in pressure within the chamber 95. This causes the level of mercury to rise within the chamber 95 until the electrical contacts 97 are covered, thereby closing the electrical circuit and energizing the coil 103 of the solenoid valve 80—a. When the coil 103 is thus energized, the armature 101 is lifted to raise the valve element 99 to open position, thus permitting drainage of water from the cylinder 55. The burners 42 are then moved downward, as previously described, until they again come opposite an uncollapsed portion of the tube 32, whereupon escape of air from the nozzle 63 is again restricted and the cycle is repeated to halt the burners until this new portion of the tube 32 is also collapsed.

Thus, with the mercury switch 91 of Figures 8 and 9, the tube-forming operation proceeds in exactly the same way as previously described in connection with embodiment of Figures 1 to 7; the only difference being that the mercury switch 91 closes the electrical circuit upon drop in pressure while the switch 73 opens the circuit upon drop in pressure, so that they require oppositely-acting solenoid valves as discussed hereinabove.

The ram 71 may be tensioned by spring-pressure or other conventional means, in place of air-pressure, so as to maintain the follower shoe 70 in contact with the tube 32.

In Figure 10 there is shown another form of switch 104 which may be used in place of the mercury switches 73 and 91 described hereinabove.

The switch 104 is adapted for use with a nozzle 63 and tube 64, and an air-operated ram 71 as described hereinabove; air under pressure being supplied to the tube 64 and nozzle 63 through the valve 68, and air under pressure being supplied to the ram 71 through the line 72.

The switch 104 includes a mercury switch element 105 which is tiltably mounted within a casing 106 upon a pivot 107. The mercury switch element 105 is of well-known construction wherein a pair of electrical contacts are disposed at one end of a tiltable chamber containing a relatively small body of mercury. Thus, when the mercury switch element 105 is tilted counterwise to the position shown in solid lines in Figure 10, the body of mercury therewithin moves to the left-hand end of the chamber to submerge the electrical contacts and to close the electrical circuit. When, on the other hand, the mercury switch element 105 is moved clockwise to the position shown in dotted lines in Figure 10, the mercury moves to the right and away from the electrical contacts, thereby to break the electrical circuit.

A bellows 108 is provided within the casing 106; the upper free end of the bellows 108 being connected to the left-hand end of the mercury switch element 105. Air under pressure is supplied to the bellows 108 from the valve 68 through a conduit 109.

A second mercury switch element 110 similar to the element 105 described above in pivotally mounted as at 111 below the casing 106. The mercury switch element 110 is connected in series with the element 105; the wiring 112 therefor leading to a spring-pressed solenoid valve 80—a similar to that shown in Figure 8.

An arm 113 connects the switch element 110 to the handle 114 of a second valve 115 disposed below the valve 68 in the air line; a pin 116 on said arm 113 fitting within a slot 117 in the valve handle 114. When the valve handle 114 is moved to its upper open position, as shown in solid lines in Figure 10, the switch element 110 is automatically tilted to closed position. When, on the other hand, the valve handle 114 is moved to its lower closed position, as shown in dotted lines in Figure 10, the switch element 110 is automatically moved to open position to break the electrical circuit between the switch element 105 and the solenoid valve 80—a.

Thus, the switch element 110 acts as a safety. That is, with the connection between the switch element 110 and the valve 115, the circuit between the main switch element 105 and the solenoid valve 80—a must necessarily be complete when the air to the nozzle 63 is turned on. When, on the other hand, the air to the nozzle 63 is turned off through the valve 115, the circuit between the switch element 105 and the solenoid valve 80—a is automatically broken, so that the solenoid valve cannot accidently open to permit drainage of water from the cylinder 55.

The operation of the switch 104 of Figure 10 is as follows:

When the valve handle 114 is turned to open position, as shown in solid lines in Figure 10, to close the switch element 110, and when air under pressure is thereby supplied to the nozzle 63 and to the bellows 108, and when the nozzle 63 is opposite an uncollapsed portion of the tube 32 so that escape of air therefrom is partially restricted, the air pressure within the bellows 108 builds up to expand the bellows and thereby to tilt the switch element 105 clockwise to the open position shown in dotted lines in Figure 10. The electrical circuit is thus broken and the coil of the solenoid valve 80—a is de-energized to close the solenoid valve and thus to prevent drainage of water from the cylinder 55. This maintains the burners 42 in fixed position until the adjacent portion of the tube 32 is heated to its softening point and collapsed upon the mandrel. When this occurs, the clearance between the nozzle 63 and the tube is increased to permit greater escape of air from the nozzle and thereby to lower the pressure within the bellows 108. This causes the bellows 108 to contract and to move the switch element 105 to the closed position shown in solid lines in Figure 10. This closes the electrical circuit and energizes the coil of the solenoid valve 80—a to open the solenoid valve and to permit drainage of water from the cylinder 55. The burners 42 are then moved downward until the nozzle 63 again comes opposite uncollapsed portion of the tube 32, whereupon escape of air from said nozzle 63 is again partially restricted and air pressure builds up within the bellows 108 to repeat the cycle.

In Figure 11, I have shown a modified form of the present invention wherein purely mechanical means are employed for raising and lowering the burners, in place of the hydraulic means shown in Figures 1 and 2.

In the embodiment of Figure 11, the manifold 43—a which is slidably mounted on the posts 44 as described in connection with the embodiment of Figures 1 and 2, is provided with a screw-threaded socket 118 with which a worm shaft 119 is operatively engaged; the worm shaft 119 being suitably journalled at its lower end in any conventional manner in the upper platform 120 of the frame 121.

A spur gear 122 is provided somewhat above the lower end of the worm shaft 119; the pinion gear 123 being operatively engaged with the spur gear 122.

A motor 124 is mounted upon the lower platform 125 of the frame 121 and is adapted to drive the worm shaft 119 through a drive shaft 126, a gear box 127, a horizontal shaft 128, meshing bevel gears 129 and 130 and the pinion shaft 131.

The gear box 127 is provided with suitable clutch and reversing mechanism (not shown) which may be manually operated by the handle 132 so that the worm shaft 119 can be rotated in either direction thereby alternatively to raise or lower the manifold 43—a upon the posts 44 or entirely to disconnect the worm shaft 119 from the motor 124.

A shaft 26—a leads from the gear box 127 and terminates in the spur gear 24—a which is operatively intermeshed with the gear wheel 23—a on the spindle 21—a. Thus, the spindle 21—a is rotated (together with its mandrel and glass tube) in the same way described hereinabove in connection with the embodiment of Figures 1 and 2.

The operation of the embodiment of Figure 11 is generally the same as that described in connection with the embodiment of Figures 1, 2 and 5.

That is, after manually manipulating the gear shift or handle 132 to give the glass tube 32 a preliminary warming up, the gear shift handle 132 is moved to "Up" position to raise the manifold 43—a to its uppermost position. The handle 132 is then moved to "Down" position and the switch 81 is set to "On" position to connect the direct-acting mercury switch 91 (or 104) to the motor 124.

It is apparent that collapse of the glass tube 32 upon the tapered mandrel 27 will lower the air pressure within the mercury switch 91 (or 104) to close the electrical circuit to the motor 124 and thereby to start the motor and to lower the manifold 43—a. When the air nozzle 63 comes opposite an uncollapsed portion of the tube, the air pressure in the mercury switch 91 (or 104) is raised, in the manner previously described, to break the electrical circuit to the motor 124 and thereby to stop further descent of the manifold 43—a until the lower portion of the glass tube is collapsed.

After the glass tube is fully collapsed upon the mandrel, the switch 81 is set to "Off" position, and the gear shift handle 132 can be manually manipulated to again raise the manifold 43—a.

While, for purposes of illustration I have described the novel apparatus of the present invention in conjunction with the production of tapered precision-bore metering tubes for use in rotameters or the like, the present invention has other uses and is not limited to the illustrative examples described herein.

Thus, the present invention is equally well adapted for the automatic production of tubing or the like having a cylindrical or other predetermined inner bore, by simply substituting a cylindrical or other predetermined-shape mandrel for the tapered mandrel 27.

The present invention is also adapted for automatically forming burettes, pipettes, and other surgical and laboratory apparatus, and, indeed, may be used for automatically shaping any thermoplastic tube or vessel or the like which is required to have an accurate inner bore or inner surface.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. For forming a precision-bore, a mandrel adapted to receive an oversize thermoplastic tube; means operatively associated with said mandrel for evacuating the annular space intermediate said mandrel and said tube; means for heating said tube adjacent one end thereof; and means for automatically moving said heating means along said tube responsive to collapse of the heated evacuated tube upon said mandrel, said last-mentioned means including a nozzle disposed adjacent said tube and movable with said heating means, means for supplying air under relatively constant pressure to said nozzle, and a switch actuated by change in air pressure within said nozzle and adapted automatically to regulate movement of said heating means, said switch being adapted to start movement of said heating means when pressure within said nozzle drops due to collapse of said tube upon said mandrel and being adapted to stop movement of said heating means when pressure within said nozzle rises due to the nozzle coming to an uncollapsed portion of said tube.

2. For forming a tapered rotameter tube, a tapered mandrel adapted to receive an oversize generally cylindrical thermoplastic tube; means operatively associated with said mandrel for evacuating said tube; means for heating said tube to its softening point adjacent the smaller end of said mandrel; and means for automatically moving said heating means axially along said tube responsive to collapse of the heated evacuated tube upon said mandrel, said last-mentioned means including a nozzle disposed adjacent said tube and movable with said heating means; means for supplying air under relatively constant pressure to said nozzle, and a switch actuated by change in air pressure within said nozzle and adapted automatically to regulate movement of said heating means; said switch being adapted to start movement of said heating when pressure within said nozzle drops due to collapse of said tube upon said mandrel and being adapted to stop movement of said heating means when pressure within said nozzle rises due to the nozzle coming to an uncollapsed portion of said tube.

3. For forming a precision-bore, a mandrel adapted to receive an oversize thermoplastic tube; means operatively associated with said mandrel for evacuating the annular space intermediate said mandrel and said tube, means for heating said tube adjacent one end thereof; means for moving said heating means along said tube; a nozzle disposed adjacent said tube and movable with said heating means, means for supplying air under relatively constant pressure to said nozzle, escape of air from said nozzle being more restricted when the adjacent portion of said tube is in its original condition than when said adjacent portion has collapsed upon the mandrel, and a mercury switch operatively connected to said moving means and adapted to be opened and closed by change in air pressure within said nozzle, whereby said moving means will be started when the portion of said tube adjacent said nozzle collapses upon said mandrel and will be stopped when said nozzle is moved adjacent an uncollapsed portion of said tube.

4. For forming a tapered rotameter tube, a tapered mandrel adapted to receive an oversize generally cylindrical thermoplastic tube, means operatively associated with said mandrel for evacuating said tube; means for heating said tube to its softening point adjacent the smaller end of said mandrel; means for moving said heating means along said tube; a nozzle disposed adjacent said tube and movable with said heating means; means for supplying air under relatively constant pressure to said nozzle, escape of air from said nozzle being more restricted when the adjacent portion of said tube is in its original condition than when said adjacent portion has collapsed upon the mandrel, and a mercury switch operatively connected to said moving means and adapted to be opened and closed by change in air pressure within said nozzle, whereby said moving means will be started when the portion of said tube adjacent said nozzle collapses upon said mandrel and will be stopped when said nozzle is moved adjacent an uncollapsed portion of said tube.

5. For forming a precision-bore, a vertically disposed mandrel, means for axially rotating said mandrel; means for mounting an oversize tube of thermoplastic material in fluid-tight co-axial relationship with said mandrel, means operatively associated with said mandrel for evacuating said tube, a burner disposed adjacent said tube and adapted to heat a portion thereof to its softening point, means for moving said burner vertically along said tube, and means for automatically regulating said moving means responsive to collapse of a softened portion of said tube upon said mandrel; said regulating means including a nozzle disposed adjacent said tube and adapted for movement with said burner; means for supplying air under relatively constant pressure to said nozzle, escape of air from said nozzle being more restricted when the adjacent portion of said tube is in its original condition than when it has collapsed upon the mandrel; and a switch operatively connected to said moving means and actuated by fall and rise in air pressure within said nozzle to start and stop said moving means.

6. For forming a tapered rotameter tube, a tapered vertically-disposed mandrel having its smaller end uppermost, means for axially rotating said mandrel, means for mounting an oversize generally cylindrical tube of thermoplastic material in fluid-tight co-axial relationship with said mandrel, means operatively associated with said mandrel for evacuating said tube, a burner disposed adjacent said tube and adapted to heat a portion of said tube to its softening point, means for moving said burner up along said tube to a point generally opposite the upper smaller end of said mandrel, means for lowering said burner along said tube; and means for automatically regulating the movement of said lowering means responsive to collapse of successive softened portions of said tube upon said mandrel, said regulating means including a nozzle disposed adjacent said tube; means for supplying air under generally constant pressure to said nozzle, escape of air from said nozzle being more restricted when the adjacent portion of said tube is in its original cylindrical condition than when it has collapsed upon the mandrel, and a mercury switch operatively connected to said lowering means and adapted to be actuated by fall and rise in air pressure within said nozzle to start and stop said lowering means.

7. For forming a precision bore, a vertically-disposed mandrel, means for axially rotating said mandrel, means for mounting an oversize tube of thermoplastic material upon said mandrel, means operatively associated with said mandrel for evacuating said tube, a burner movably mounted adjacent said tube and adapted to heat a portion thereof to its softening point, means including a hydraulic piston and cylinder for raising and lowering said burner, and valve means for gradually draining said cylinder so as gradually to lower said burner along said tube thereby progressively to collapse successive softened portions of said tube upon said mandrel.

8. For forming a precision bore, a vertically-disposed mandrel, means for axially rotating said mandrel, means for mounting an oversize tube of thermoplastic material upon said mandrel, means operatively associated with said mandrel for evacuating said tube, a burner movably mounted adjacent said tube and adapted to heat a portion thereof to its softening point, means including a hydraulic piston and cylinder for raising and lowering said burner, valve means for draining said cylinder, and means for automatically regulating said valve means responsive to collapse of a softened portion of said tube upon said mandrel thereby to lower said burner responsive to progressive collapse of said tube upon said mandrel, said regulating means including a nozzle disposed adjacent said tube and adapted for movement with said burner, means for supplying air under generally constant pressure to said nozzle, escape of air from said nozzle being more restricted when the adjacent portion of said tube is in its original condition than when it has collapsed upon the mandrel, and a switch operatively connected to said valve means and actuated by fall and rise in air pressure within said nozzle to open and close said valve means.

9. For forming a precision bore, a vertically-disposed mandrel, means for axially rotating said mandrel, means for mounting an oversize tube of thermoplastic material upon said mandrel, means operatively associated with said mandrel for evacuating said tube, a burner movably mounted adjacent said tube and adapted to heat a portion thereof to its softening point, means including a hydraulic piston and cylinder for raising and lowering said burner, a solenoid valve adapted adjustably to drain said cylinder, a nozzle disposed adjacent said tube and adapted for movement with said burner, means for supplying air under generally constant pressure to said nozzle, escape of air from said nozzle being more restricted when said tube is in its original condition than when it has collapsed upon the mandrel, and a mercury switch operatively connected to said solenoid valve and actuated by fall and rise in air pressure within said nozzle to open and close said solenoid valve.

10. For forming a tapered rotameter tube, a tapered mandrel adapted to receive an oversize generally cylindrical thermoplastic tube, means for co-axially rotating said tube and mandrel in generally vertical position, means for evacuating said tube, a burner disposed for vertical movement adjacent said tube and adapted to heat a portion of said tube to its softening point, means including a hydraulic piston and cylinder for moving said burner, valve means for draining said cylinder, and means for automatically regulating said valve means responsive to collapse of a softened portion of said tube upon said mandrel thereby to lower said burner responsive to progressive collapse of said tube upon said mandrel.

11. For forming a tapered rotameter tube, a tapered mandrel adapted to receive an oversize generally cylindrical thermoplastic tube, means for co-axially rotating said tube and mandrel in generally vertical position, means operatively associated with said mandrel for evacuating said tube, a burner disposed for vertical movement adjacent said tube and adapted to heat a portion of said tube to its softening point, means including a hydraulic piston and cylinder for moving said burner, valve means for draining said cylinder, and means for automatically regulating said valve means responsive to collapse of a softened portion of said tube upon said mandrel thereby to lower said burner responsive to progressive collapse of said tube upon said mandrel, said regulating means including a nozzle disposed adjacent said tube and adapted for movement with said burner, means for supplying air under generally constant pressure to said nozzle, escape of air from said nozzle being more restricted when the adjacent portion of said tube is in its original condition than when it has collapsed upon the mandrel, and a switch operatively connected to said valve means and actuated by fall and rise in air pressure within said nozzle to open and close said valve means.

12. For forming a tapered rotameter tube, a tapered mandrel adapted to receive an oversize generally cylindrical thermoplastic tube, means for co-axially rotating said tube and mandrel in generally vertical position, means operatively associated with said mandrel for evacuating said tube, a burner disposed for vertical movement adjacent said tube and adapted to heat a portion of said tube to its softening point, means including a hydraulic piston and cylinder for moving said burner, a solenoid valve adapted adjustably to drain said cylinder, a nozzle disposed adjacent said tube and adapted for movement with said burner, means for supplying air under generally constant pressure to said nozzle, escape of air from said nozzle being more restricted when it has collapsed upon the mandrel, and a mercury switch operatively connected to said solenoid valve and actuated by fall and rise in air pressure within said nozzle to open and close said solenoid valve.

13. For forming a precision bore, a mandrel adapted to receive an oversize thermoplastic tube, means for co-axially rotating said tube and mandrel, means operatively associated with said mandrel for evacuating said tube, a heating element disposed for movement along said tube and adapted to heat a portion thereof to its softening point, means including a motor and a connecting drive shaft for moving said heating element along said tube, and means for regulating said motor responsive to collapse of a softened portion of said tube upon said mandrel.

14. For forming a tapered rotameter tube, a tapered mandrel adapted to receive an oversize generally cylindrical thermoplastic tube, means for co-axially rotating said tube and mandrel, means operatively associated with said mandrel for evacuating said tube, a heating element disposed for movement along said tube and adapted to heat a portion thereof to its softening point adjacent the smaller end of said tapered mandrel, means including a motor and a connecting drive shaft for moving said heating element along said tube, and means for automatically regulating said motor responsive to collapse of a heated portion of said tube upon said mandrel.

15. For forming a tapered rotameter tube, a tapered mandrel adapted to receive an oversize generally cylindrical thermoplastic tube, means for co-axially rotating said tube and mandrel, means operatively associated with said mandrel for evacuating said tube, a heating element disposed for movement along said tube and adapted to heat a portion thereof to its softening point adjacent the smaller end of said tapered mandrel, means including a motor and a connecting drive shaft for moving said heating element along said tube, and means for automatically regulating said motor responsive to collapse of heated portion of said tube upon said mandrel, said regulating means including a nozzle disposed adjacent said tube and adapted for movement with said heating element, means for supplying air under relatively constant pressure to said nozzle, escape of air from said nozzle being more restricted when said tube is in its original condition than when it has collapsed upon the mandrel, and a mercury switch operatively connected to said motor and adapted to be actuated by fall and rise in pressure within said nozzle thereby to start and stop said motor.

NATHANIEL BREWER.

REFERENCES CITED

The following references are of record in the file of this patent:

UNITED STATES PATENTS

| Number | Name | Date |
|---|---|---|
| 1,301,714 | Kueppers | Apr. 22, 1919 |
| 1,999,525 | Morscholz | Apr. 30, 1935 |
| 2,368,169 | Smith | Jan. 30, 1945 |
| 2,368,170 | Smith | Jan. 30, 1945 |
| 2,423,113 | Pfleghar | July 1, 1947 |

FOREIGN PATENTS

| Number | Country | Date |
|---|---|---|
| 497,486 | Great Britain | Dec. 19, 1938 |